United States Patent
Steinbrecher et al.

(10) Patent No.: US 9,409,543 B2
(45) Date of Patent: Aug. 9, 2016

(54) VARIABLE TRAJECTORY SIDE CURTAIN AIRBAGS

(71) Applicant: Toyota Motor Engineering & Manufacturing North America, Inc., Erlanger, KY (US)

(72) Inventors: Robert C. Steinbrecher, Dexter, MI (US); Todd P. Lang, Plymouth, MI (US); Adam Ludwig, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/327,654

(22) Filed: Jul. 10, 2014

(65) Prior Publication Data

US 2016/0009245 A1   Jan. 14, 2016

(51) Int. Cl.
*B60R 21/237* (2006.01)
*B60R 21/232* (2011.01)
*B60R 21/213* (2011.01)
*B60R 21/233* (2006.01)
*B60R 21/16* (2006.01)

(52) U.S. Cl.
CPC ............. *B60R 21/237* (2013.01); *B60R 21/213* (2013.01); *B60R 21/232* (2013.01); *B60R 21/233* (2013.01); *B60R 2021/161* (2013.01)

(58) Field of Classification Search
CPC .. B60R 21/237; B60R 21/232; B60R 21/213; B60R 21/214; B60R 21/233; B60R 2021/0006; B60R 2021/0018

USPC ............................................... 280/730.2, 729
See application file for complete search history.

(56) References Cited

U.S. PATENT DOCUMENTS

| | | | |
|---|---|---|---|
| 7,004,501 B2 | 2/2006 | Schneider et al. | |
| 7,185,914 B2 | 3/2007 | Recker et al. | |
| 7,770,919 B2* | 8/2010 | Mendez | B60R 21/232 280/730.2 |
| 7,845,674 B2 | 12/2010 | Berntsson et al. | |
| 2006/0061075 A1* | 3/2006 | Aoki | B60R 21/201 280/730.2 |
| 2007/0075532 A1 | 4/2007 | Yokoyama et al. | |
| 2013/0056965 A1 | 3/2013 | Sugimori et al. | |

FOREIGN PATENT DOCUMENTS

| | | |
|---|---|---|
| JP | 2010126078 A | 6/2010 |
| JP | 2011240809 A | 1/2011 |
| JP | 2011246095 A | 12/2011 |
| WO | 2007136027 A1 | 11/2007 |

* cited by examiner

*Primary Examiner* — Keith Frisby
(74) *Attorney, Agent, or Firm* — Christopher G. Darrow; Darrow Mustafa PC

(57) ABSTRACT

Side curtain airbag assemblies for use inside motor vehicles and methods of preparing airbag assemblies are described herein that allow for the deployment of a curtain with varying trajectory. The curtain may be attached to an inflator that is configured to rapidly inflate the curtain from a folded condition to a deployed condition upon signals generated from an activation event, such as a collision or vehicle roll-over. The trajectory of the curtain can be defined as the direction of the curtain being inflated in relation to other components of a vehicle. Different portions of the curtain may have different fold configurations, allowing for tuning of the trajectory upon deployment of each distinct portion of the curtain.

12 Claims, 5 Drawing Sheets

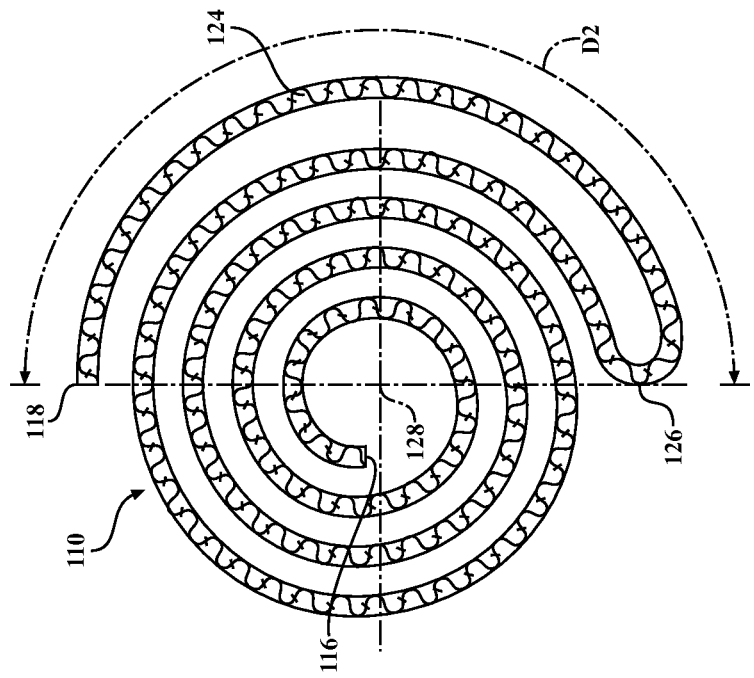
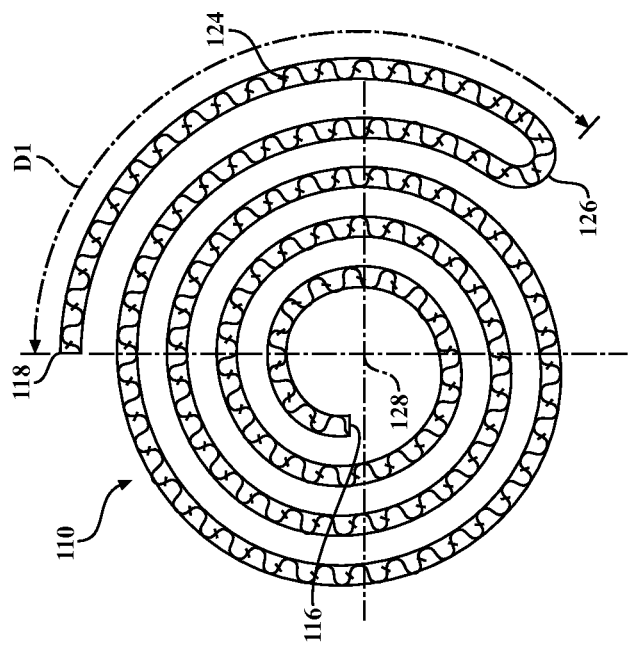

VARIABLE TRAJECTORY SIDE CURTAIN AIRBAGS

BACKGROUND OF THE DISCLOSURE

The present disclosure relates generally to side impact or rollover inflatable curtain airbags and, more particularly, to apparatuses for deploying such airbags with variable trajectories.

Various side impact or rollover airbags (often called curtain or side curtain airbags) are utilized in motor vehicles to provide cushioning between the side of a vehicle and an occupant. Side curtain airbags may be stored near a roofline of a vehicle and, upon an activation event, may be inflated and deployed to a position between an occupant and the side of the vehicle. Vehicle sensors may be used to detect activation events and trigger an inflator to rapidly fill a curtain with air. Because of the positions of the airbag assembly, vehicle structure, and occupants, side curtain airbags are often required to be inflated in a particular trajectory towards a deployed position.

Folding a curtain with a particular pattern has been utilized in attempts to control the trajectory of side curtain airbags, but due to vehicle and curtain geometry it may remain difficult to control the trajectory of certain portions of a curtain within a side curtain airbag assembly.

SUMMARY OF THE DISCLOSURE

Disclosed herein are embodiments of airbag assemblies having folded curtains configured for variable trajectory and methods for preparing such assemblies. The assemblies may include an inflator that is in fluid communication with chambers within an air bag curtain. The curtain may have two or more sections having different fold patterns to allow for the desired deployment trajectories for each of the sections.

In one implementation, a side curtain airbag assembly may comprise an inflator and a folded curtain having one or more interior chambers in fluid communication with the inflator, wherein the curtain comprises at least a first and second portion, the first portion having a first folded pattern and the second portion having a second folded pattern distinct from the first folded pattern. The assembly may also comprise a plurality of anchors configured to retain a portion of the curtain to one or more vehicle components.

In another implementation, a side curtain airbag assembly may comprise an inflator comprising a body configured to retain compressed gas, mounting structure configured to attach the inflator to one or more vehicle components, and two gas outlet nozzles projecting in opposite directions. The assembly may further include a folded curtain having one or more interior chambers in fluid communication with the inflator, wherein the curtain comprises at least a first and second portion, the first portion having a first folded pattern and the second portion having a second folded pattern distinct from the first folded pattern. The assembly may further comprise a plurality of anchors configured to retain a portion of the curtain to one or more vehicle components. Each of the first and second folded patterns may comprise a top folded section formed by doubling a portion of the curtain back upon itself and a bottom rolled section, and the top folded section of the first folded pattern is different in length from the top folded section of the second folded pattern.

In yet another implementation, a method for tuning the trajectory of a side curtain airbag assembly is disclosed that comprises the steps of providing a curtain having one or more interior chambers in fluid communication with an inflator, and folding the curtain into a folded condition along a top edge of the curtain such that a first portion of the curtain has a substantially consistent first folded cross section and that a second portion of the curtain has a substantially consistent second folded cross section distinct from the first folded cross section.

The foregoing features and elements may be combined in various combinations without exclusivity unless expressly indicated otherwise. These features and elements as well as the operation thereof will become more apparent in light of the following description and the accompanying drawings. It should be appreciated, however, that the following description and drawings are intended to be exemplary in natures and non-limiting.

BRIEF DESCRIPTION OF THE DRAWINGS

The description makes reference to the accompanying drawings wherein like reference numerals refer to like parts throughout the several views, and wherein:

FIGS. 4A and 4B show partial cross-sectional views of an airbag cushion in a folded condition;

DETAILED DESCRIPTION

As mentioned above, it may be difficult to control the deployment trajectory of a curtain airbag along the length of a side curtain airbag assembly. Side curtain airbag assemblies for use inside motor vehicles are described herein that allow for the deployment of a curtain with varying trajectory. The curtain may be attached to an inflator that is configured to rapidly inflate the curtain from a folded condition to a deployed condition upon signals generated from an activation event, such as a collision or vehicle roll-over. The trajectory of the curtain may be defined as the direction the curtain expands during deployment in relation to other components of a vehicle. Different portions of the curtain may have different fold configurations while in a folded condition that allows for the trajectory of each portion to be controlled, or "tuned," separately.

Methods of preparing side curtain airbags are described herein that include folding a curtain such that different portions of the curtain have different fold patterns. In some examples, portions of the curtain may be folded to varying plus one fold patterns, where a top portion of the curtain is folded back upon itself and the bottom portion is rolled up upon itself. Different lengths of the top fold portion may allow for different trajectory deployment.

As used herein, the term "side curtain airbags" may include any airbag assemblies configured to provide cushioning near the side of an interior of a vehicle. Side curtain airbags may be located near a junction between a roof and side of a vehicle and configured to deploy generally towards the floor of a vehicle, but it is contemplated that such airbags may be installed in other locations.

As used herein, the term "activation event" may include any event in which it is desired for an airbag assembly to deploy. Some examples of activation events may include a collision involving the vehicle, sudden changes in measured acceleration or deceleration of the vehicle or occupants, rollover conditions, and vehicle component failure. Known automotive systems may send signals to an airbag assembly upon the sensing of an activation event.

Figure 1:
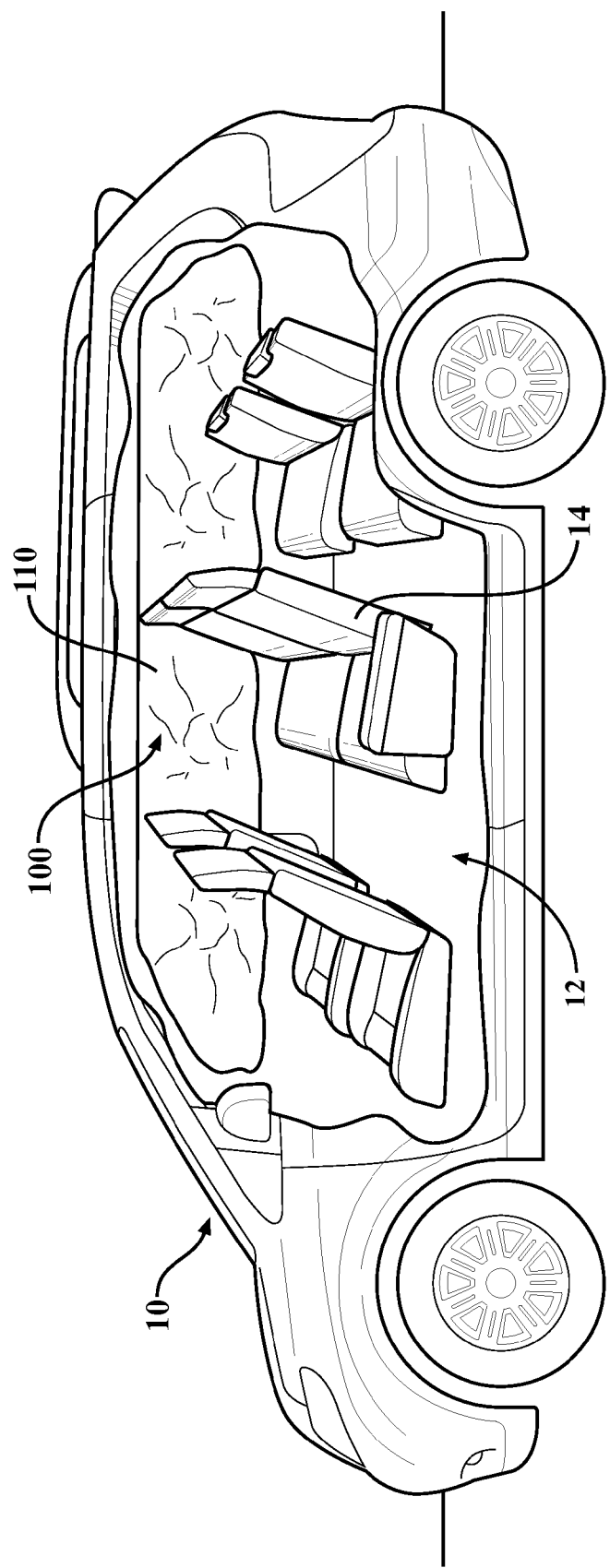
FIG. 1 shows a partial perspective view of an exemplary vehicle with a side curtain airbag assembly in a deployed condition.

FIG. 1 shows a perspective view of an exemplary vehicle 10 with a partial view of an interior 12. Vehicle 10 may generally include seating 14 for potential occupants and one or more side curtain airbag assemblies 100. Airbag assembly 100 may generally include a curtain 110, shown in a deployed condition in FIG. 1. Vehicle 10 is shown as a being a personal use "minivan" with three rows of seating. It is contemplated that vehicle 10 may include a variety of vehicles of several different sizes and configurations having an interior compartment for carrying occupants.

Figure 2:
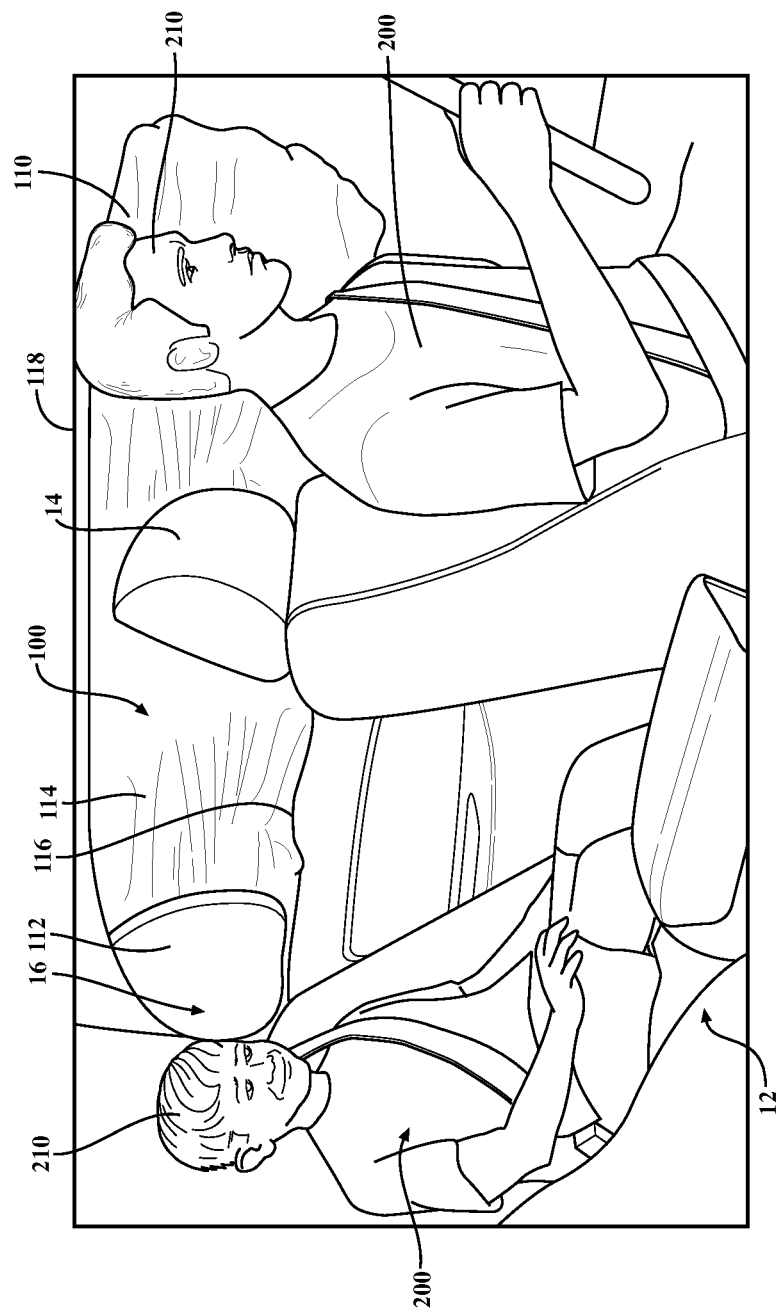
FIG. 2 shows a partial perspective view of an interior of a vehicle with a side curtain airbag assembly in a deployed condition.

FIG. 2 shows a more detailed view of an example interior 12 in a vehicle 10, with occupants 200 utilizing seating 14. Head 210 may be defined on occupant 200. In some embodiments, curtain 110 may have air chambers 112 and non-inflatable portions 114. Curtain 110 may define bottom edge 116 and a top edge 118. Top edge 118 may be attached to a portion of vehicle 10. For example, bottom edge 116 may extend downward from top edge 118 in the deployed condition shown in FIGS. 1 and 2. Air may be introduced into curtain 110 from one or more inflators at areas near top edge 118 to fill curtain 110 during deployment.

As shown in FIG. 2, a deployment zone 16 of airbag assembly 100 may be located between head 210 of occupant 200 and the side or window of vehicle 10. In some embodiments, curtain 110 is configured to be deployed into deployment zone 16 subsequent to an activation event to provide cushioning between occupant 200 and portions of vehicle 10. For example, air chambers 112 may be located near head 210 of occupant 200. Due to the locations of occupants 200 and vehicle components and the need for rapid deployment, deployment zone 16 may define a relatively small angular window for trajectory from the location of curtain 110 in its folded condition. In addition, certain governmental or internal standards may require that airbag assembly 100 deploy with certain characteristics.

The timing required to deploy curtain 110 may require air to be rapidly introduced into curtain 110 to cause curtain 110 to unfold and inflate into the deployment zone. Several factors may cause curtain 110 to deploy with trajectories that may not be acceptable for certain areas of the airbag assembly 100. Curtain 110 may have one section that deploys in an unacceptable trajectory while other sections of curtain 110 deploy in acceptable trajectories. Unacceptable trajectories may include a situation where a portion of curtain 110 deploys too far towards the interior or exterior of vehicle 10. For example, it may be unacceptable for a portion of curtain 110 to contact and break through a side window of vehicle 10, or for curtain 110 to deploy too close to head 210 of an occupant 200.

Figure 3:
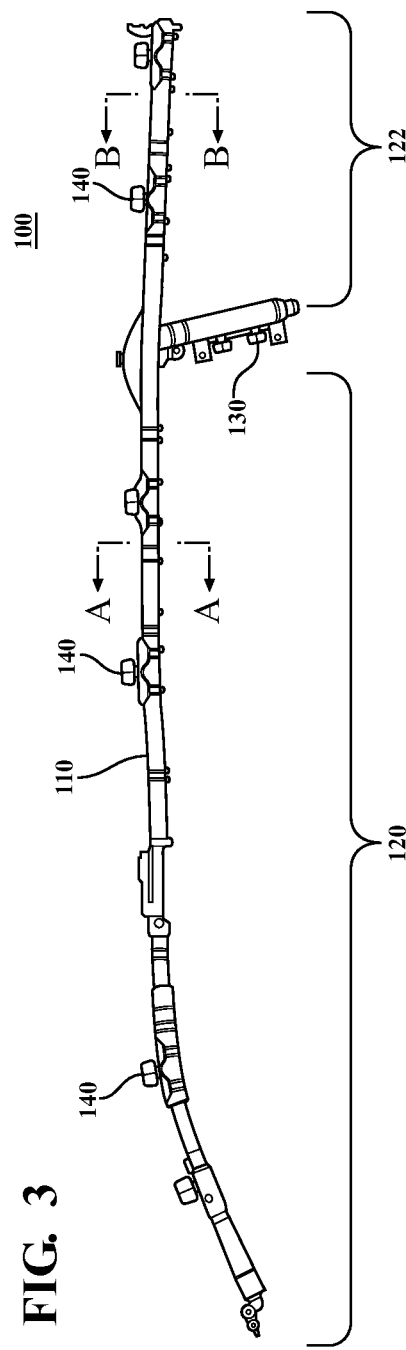
FIG. 3 shows a perspective view of a side curtain airbag in a folded condition.

FIG. 3 shows a perspective view of one embodiment of airbag assembly 100 in a folded condition. The folded condition represents an assembled condition of airbag assembly 100 prior to a deployment. In some embodiments, airbag assembly 100 may include curtain 110 having a first portion 120 and a second portion 122. Airbag assembly 100 may further include an inflator 130 and one or more attachment anchors 140. Attachment anchors 140 may be attached near top edge 118 of curtain 110 and may be configured to attach to structure on vehicle 10. For example, anchor 140 may include a tab with an aperture capable of receiving a bolt that may attach the anchor 140 to a roof panel of vehicle 10.

In some embodiments, the first portion 120 of curtain 110 may be defined as the section of curtain 110 located on one side of inflator 130, with second portion 122 located on the other side. For example, first portion 120 may be located towards the front of vehicle 10 in relation to inflator 130, and second portion 122 may be located towards the rear of vehicle 10. It may be desirable to tune first and second portions 120/122 separately to control the trajectory of curtain 110 along the entire airbag assembly 100. While two portions 120/122 and one inflator 130 are shown in the Figures, it is contemplated that three or more portions and/or two or more inflators may be included in some embodiments.

Curtain 110 may be folded in particular patterns in attempts to control the trajectory of curtain 110 upon inflation. The pattern of folding may influence the deployment of curtain 110 as air is rapidly introduced into curtain 110, generally from areas near top edge 118. For example, curtain 110 may be rolled up on itself having a spiral shaped cross section. In addition to rolled folds, other fold patterns may be used such as accordion folds, wrap folds, and combinations thereof. FIGS. 4A and 4B show cross sectional views exemplary fold patterns in curtain 110. FIG. 4A may be the cross section of curtain 110 taken along A-A of FIG. 3, while FIG. 4B may be the cross section of curtain 110 taken along B-B of FIG. 3. Thus, first portion 120 of curtain 110 may have the fold pattern shown in FIG. 4A, and second portion 122 may have a distinct fold pattern shown in FIG. 4B. In these examples, both sections may have fold patterns that include a "+1" fold and rolled fold sections. The +1 fold may be defined as a top fold 124 near top edge 118 where curtain 110 is folded back upon itself forming crease 126. The rolled fold pattern may start after crease 126 and continue to bottom edge 116 and be wrapped around center 128.

In some embodiments, first portion 120 may include a top fold having a length D1, which may be measured from top edge 118 to crease 126. Second portion 122 may include a top fold having a length D2, where D1 and D2 may be different values. For example, D2 of the second portion 122 may be greater than D1 of first portion 120. Such different fold patterns may allow for the second portion 122 to be tuned to deploy with different characteristics than first portion 120. For example, the longer top fold may cause second portion 122 of curtain 110 to deploy further to the inside of vehicle 10 compared to the same section having a shorter top fold.

While embodiments may be described herein with reference to the +1 fold pattern shown in FIGS. 4A and 4B, it is contemplated that other fold patterns may be utilized to provide desired deployment trajectories. For example, first and second portions 120/122 may have fold patterns of different styles such as accordion folds, each having different characteristics or dimensions. Furthermore, first and second portions 120/122 may be folded in different patterns, such as an accordion fold and a roll fold. In addition, curtain 110 may have a fold pattern that gradually changes from a first fold pattern to a second pattern. For example, a +1 fold may have a top fold 124 that gradually changes dimensions along the length of curtain 110.

Figure 5:
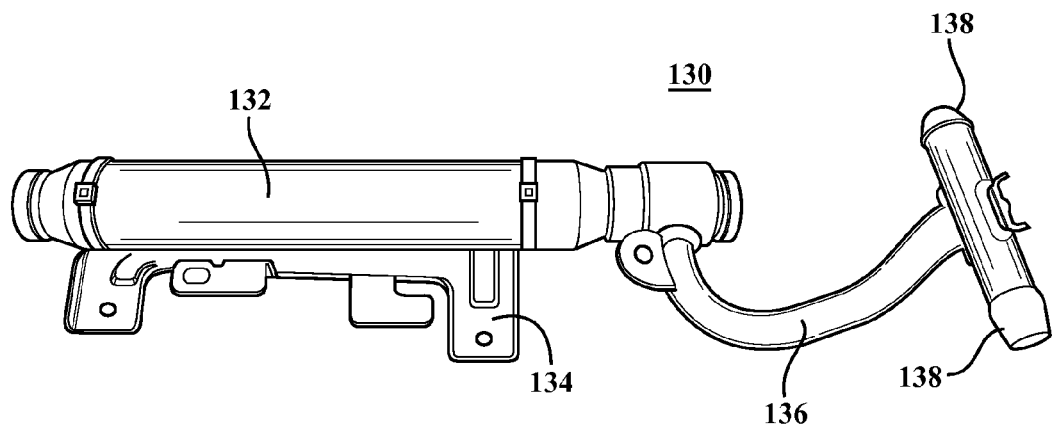
FIG. 5 shows a perspective view of an inflator of an airbag assembly.

An exemplary inflator 130 is shown in FIG. 5. As shown, inflator 130 may generally include inflator body 132, inflator mounting structure 134, and inflator outlet 136 with one or more outlet nozzles 138. In some embodiments, inflator body 132 may be a container capable of storing a compressed gas for outputting into curtain 110. For example, inflator body 132 may be cylindrical as shown in FIG. 5. Inflator body 132 may be of other types, such as a pyrotechnical type, wherein combustion is used to generate gas from a propellant to inflate curtain 110. Inflator body 132 may also be a combination of a pyrotechnical and stored gas type. Inflator outlet 136 may extend from inflator body 132 and may terminate with outlet nozzles 138. In some embodiments, curtain 110 may be configured to receive outlet nozzles 138 to allow the transfer of gas from inflator 130 into air chambers 112 of curtain 110.

Inflator 130 may include mounting structure 134 to attach inflator 130 to portions of vehicle 10. For example, mounting structure 134 may comprise brackets with apertures sized to receive fasteners to attach inflator 130 to vehicle 10. In some embodiments, inflator 130 may be configured to attach to an inside surface of a side panel of vehicle 10 near a 'C' pillar between side windows of vehicle 10. In such a configuration, inflator 130 may be attached to the 'C' pillar of vehicle 10, with outlet 136 projecting upwards to outlet nozzles 138 located near the roofline of vehicle 10. It is further contemplated that inflator 130 may be attached to other locations within vehicle 10 depending on the particular application, such as at the front or rear of an airbag assembly in the 'A' or 'D' pillar of vehicle 10. In such examples, inflator 130 may include one or more outlet nozzles 138 that project towards curtain 110.

Figure 7:
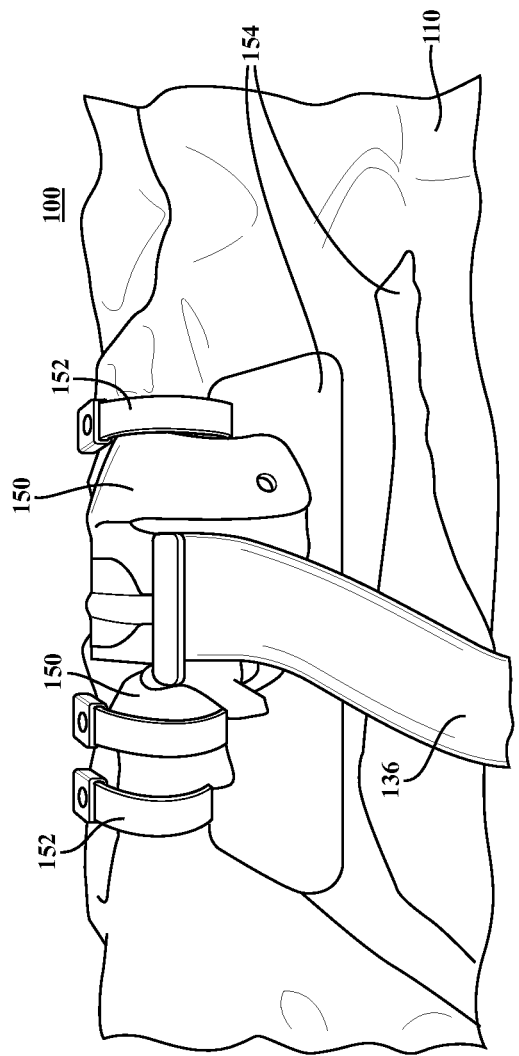
FIGS. 6 and 7 show perspective views of an inflator and cushion of an airbag assembly.
Figure 6:
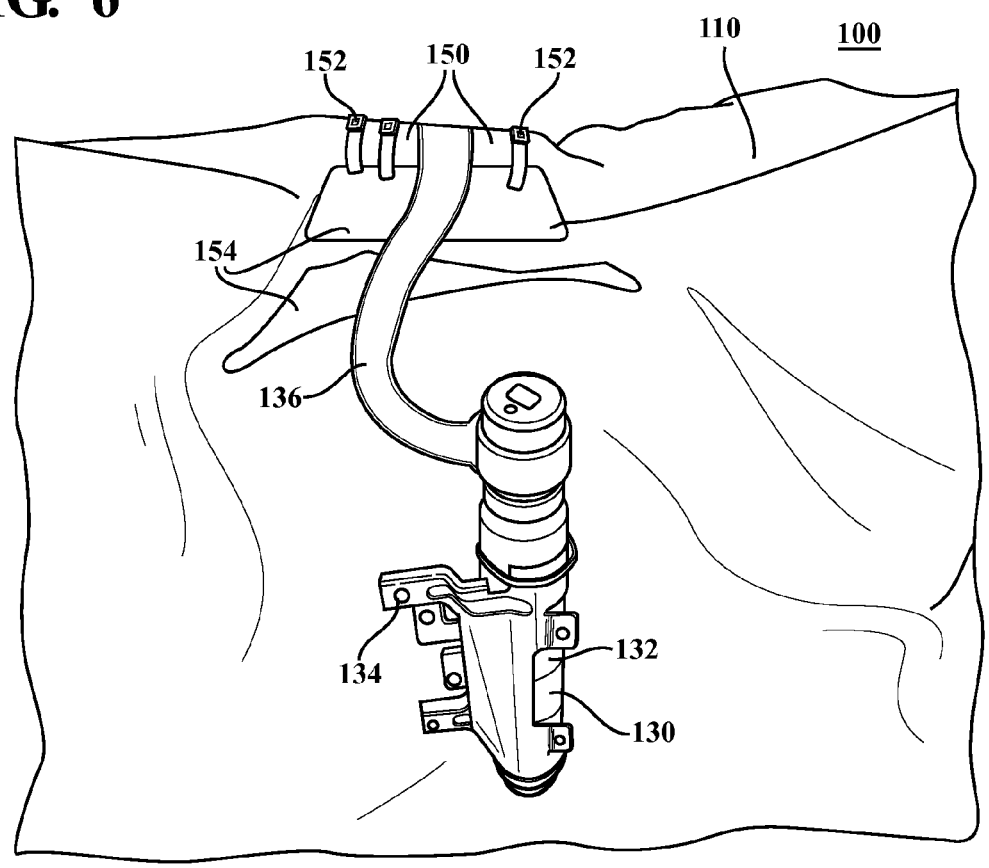

The interaction between inflator 130 and curtain 110 may be further described with reference to FIGS. 6 and 7. In some embodiments, curtain 110 may include inlet portions 150 configured to receive outlet nozzles 138. For example, inlet portions 150 may be sized such that outlet nozzle 138 of inflator 130 may at least partially extend into inlet portion 150 of curtain 110. Curtain 110 may have two inlet portions 150, one for each outlet nozzle 138. Inflator 130 may be attached to curtain 110 using retaining straps 152. Retaining straps 152 may be configured to tighten around inlet portion 150 of curtain 110 and outlet nozzle 138 of inflator 130.

In some embodiments, curtain 110 may include cutouts or curtain apertures 154 located near inlet portions 150. The embodiments shown in FIGS. 6 and 7 may have two apertures 154 located near the inlet portions 150 of curtain 110. One of the curtain apertures 154 may be defined as a cutout of curtain 110 between inlet portions 150. For example, apertures 154 may extend from an area near inlet portions 150 towards the interior of curtain 110. The configuration shown in FIGS. 6 and 7 may reduce or prevent the pinching of curtain 110 near top edge 118. For example, having two inlet portions 150 and apertures 154 in curtain 110 separating the first and second portions 120/122, any pinching or unevenness within curtain 110 may be reduced if first and second portions 120/122 are folded differently.

While first and second portions 120/122 may be separated by inflator 130 and apertures 154 as shown in the Figures, it is contemplated that in some embodiments of curtain 110 the border between first and second portions 120/122 may not include such features. For example, one or more slits may be defined in top edge 118 of curtain 110 to separate first or second portions 120/122. It is also contemplated that fold patterns alone may distinguish first and second portions 120/122.

A method for preparing a side curtain airbag may be described with reference to airbag assembly 100. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

A curtain 110 may be provided with air chambers 112 configured to receive air from an inflator 130. Curtain 110 may be attached to inflator 130 such that air chambers 112 are in fluid communication with inflator 130. For example, curtain 110 may include inlet portions 150 configured to receive outlet nozzles 138 of inflator 130. The curtain 110 may be attached to inflator using retaining straps 152.

Curtain 110 may be folded into the folded condition shown in FIG. 3 for example. In some embodiments, curtain 110 may be folded with a "+1" top fold 124 and roll folded. For example, a top fold may be created in curtain 110 by clamping a portion of curtain 110 near top edge 118. Curtain 110 may then be folded back upon itself forming crease 126. Curtain 110 may then be rolled up from bottom edge 116 to top fold 124. Curtain 110 may be folded with multiple fold patterns, such as distinct fold patterns shown in FIGS. 4A and 4B in first and second portions 120/122 of curtain 110. The variable "+1" top fold 124 may be accomplished by changing the amount of curtain 110 that is clamped and folded prior to roll-folding curtain 110 to bottom edge 116.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A side curtain airbag assembly, comprising:
a folded curtain having one or more interior chambers configured to be in fluid communication with an inflator, wherein the curtain comprises at least a first and second portion, the first portion having a first folded pattern and the second portion having a second folded pattern distinct from the first folded pattern,
the first folded pattern having a rolled portion and only one top fold, the top fold transitioning to the rolled portion at a first crease, the top fold extending from the first crease and terminating at a top edge of the folded curtain, a first distance being defined between the first crease and the top edge,
the second folded pattern having a rolled portion and only one top fold, the top fold transitioning to the rolled portion at a second crease, the top fold extending from the second crease and terminating at the top edge of the folded curtain, a second distance being defined between the second crease and the top edge, and
the first distance being different than the second distance.

2. The side curtain airbag assembly of claim 1, wherein the inflator comprises a container body that is one of a stored gas type, pyrotechnic type, and a combination of stored gas and pyrotechnic type.

3. The side curtain airbag assembly of claim 1, wherein the inflator comprises two outlet nozzles configured to introduce air into the curtain.

4. The side curtain airbag assembly of claim 3, wherein the two outlet nozzles project outward from the inflator in substantially opposite directions.

5. The side curtain airbag assembly of claim 4, wherein the curtain further comprises two inlet portions configured to receive at least a portion of the outlet nozzles of the inflator.

6. The side curtain airbag assembly of claim 4, wherein the inflator separates the first and second portions of the folded curtain.

7. The side curtain airbag assembly of claim 6, wherein the curtain further comprises at least one cutout separating the first and second portions of the curtain.

8. A side curtain airbag assembly, comprising:
an inflator comprising a body configured to retain compressed gas, mounting structure configured to attach the inflator to one or more vehicle components, and two gas outlet nozzles projecting in substantially opposite directions;
a folded curtain having one or more interior chambers in fluid communication with the inflator, wherein the curtain comprises at least a first and second portion, the first portion having a first folded pattern and the second portion having a second folded pattern distinct from the first folded pattern; and
a plurality of anchors configured to retain a portion of the curtain to one or more vehicle components,
the first folded pattern having a rolled portion and only one top fold, the top fold transitioning to the rolled portion at a first crease, the top fold extending from the first crease and terminating at a top edge of the folded curtain, a first distance being defined between the first crease and the top edge,
the second folded pattern having a rolled portion and only one top fold, the top fold transitioning to the rolled portion at a second crease, the top fold extending from the second crease and terminating at the top edge of the folded curtain, a second distance being defined between the second crease and the top edge, and
the first distance being different than the second distance.

9. The side curtain airbag assembly of claim 8, wherein the first distance is less than the second distance.

10. The side curtain airbag assembly of claim 8, wherein the curtain further includes two inlet portions configured to receive at least a portion of the outlet nozzle.

11. The side curtain airbag assembly of claim 10, further comprising retaining straps configured to tighten around the inlet portions and outlet nozzles.

12. The side curtain airbag assembly of claim 8, wherein the first and second portions of the curtain are separated by the inflator and one or more cutouts defined in the curtain.

* * * * *